United States Patent [19]
Daly

[11] Patent Number: 5,769,346
[45] Date of Patent: Jun. 23, 1998

[54] TAPE BUCKLING MECHANISM FOR SINGLE REEL CARTRIDGE TAPE RECORDING

[75] Inventor: Keith Daly, Shrewsbury, Mass.

[73] Assignee: Quantum Corporation, Milpitas, Calif.

[21] Appl. No.: 666,854

[22] Filed: Jun. 19, 1996

[51] Int. Cl.[6] .............................. G03B 1/58; G11B 15/66
[52] U.S. Cl. .................................... 242/332.4; 242/532.7
[58] Field of Search ............................ 242/332.4, 348.2, 242/532.7, 562.1, 336; 360/132; 29/819

[56] References Cited

U.S. PATENT DOCUMENTS

| | | | |
|---|---|---|---|
| 3,197,150 | 7/1965 | Camras | 242/332.4 |
| 3,706,423 | 12/1972 | Neff | 242/332.4 |
| 4,334,656 | 6/1982 | Crawford et al. | 242/332.4 |
| 4,399,936 | 8/1983 | Rueger | 242/332.4 X |
| 4,572,460 | 2/1986 | Hertrich . | |
| 4,662,049 | 5/1987 | Hertrich | 29/267 |
| 4,679,747 | 7/1987 | Smith | 242/332.4 |
| 4,720,913 | 1/1988 | Hertrich | 242/332.4 X |
| 5,165,083 | 11/1992 | Flor et al. | 360/132 |

*Primary Examiner*—Daniel P. Stodola
*Assistant Examiner*—Gregory J. Strimbu
*Attorney, Agent, or Firm*—David B. Harrison; John C. Chen

[57] ABSTRACT

A buckling mechanism for improving buckling reliability between a take-up leader and a cartridge leader. The mechanism includes a buckling link, buckling arm and a link driver. The buckling link is biased about one end and includes a protruding portion having a T-shape face at the other end. The combination of the dimensions of the protruding portion and the constant biasing force ensures that the leaders are positioned and remain in position for successful buckling as the tape cartridge is inserted into the tape drive. The buckling link is mounted such that it functions independently of the link driver and buckling arm, enabling the buckling link to maintain the biasing force against the take-up leader even after the buckling arm releases the take-up leader.

6 Claims, 4 Drawing Sheets

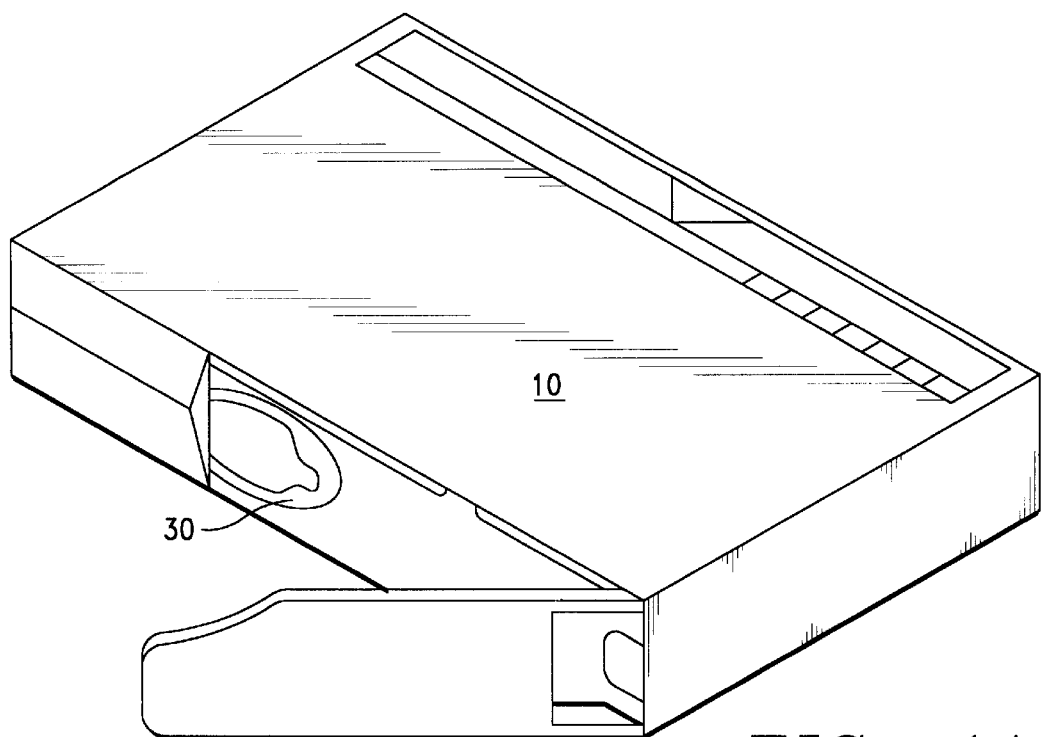
FIG.—1A
(PRIOR ART)
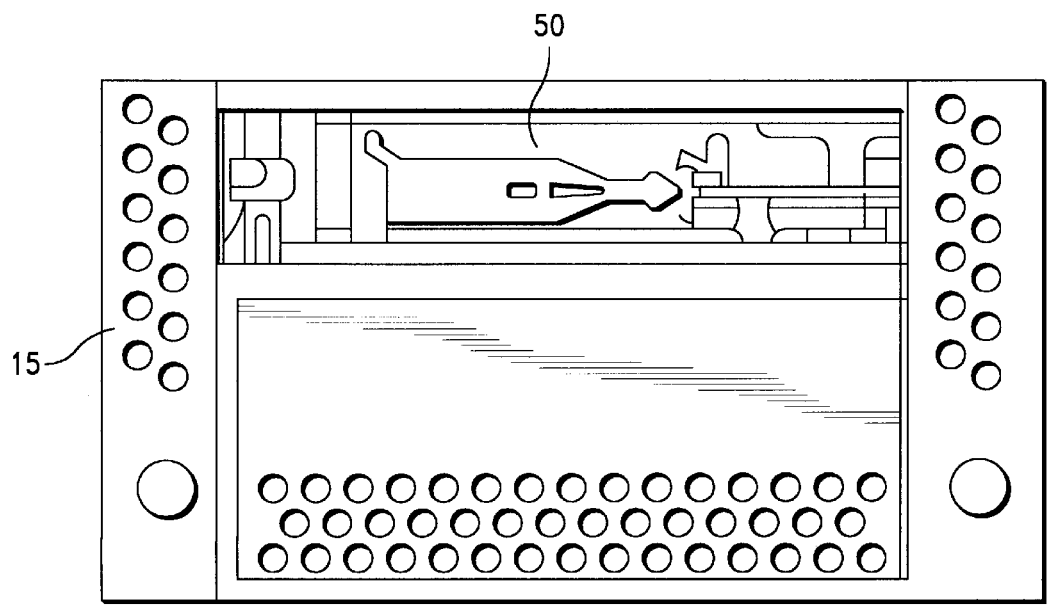
FIG.—1B
(PRIOR ART)

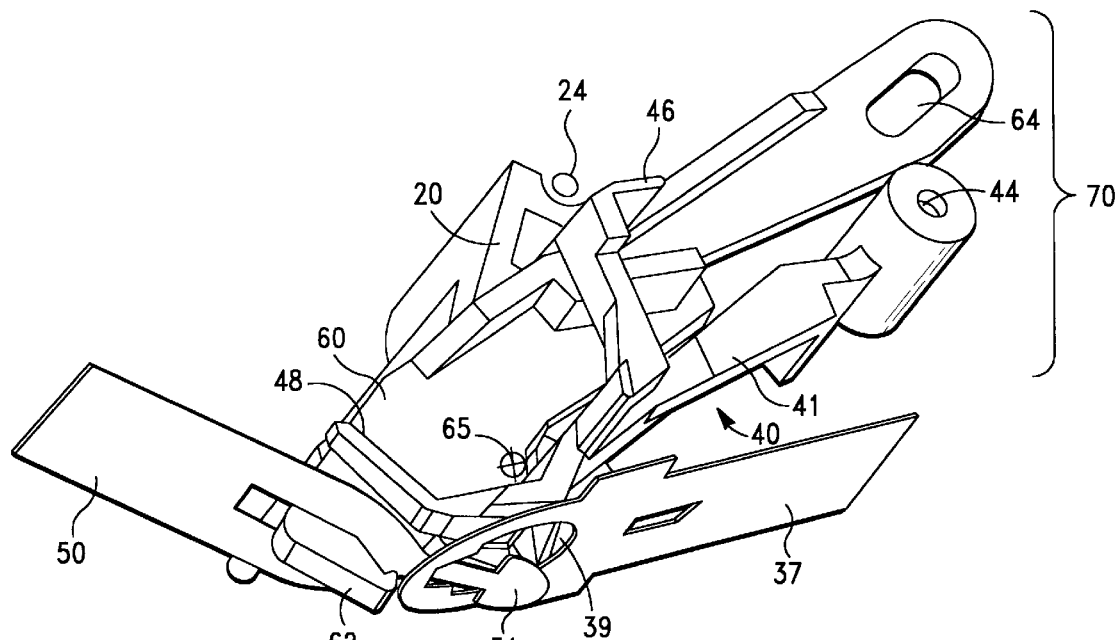
FIG.—3A
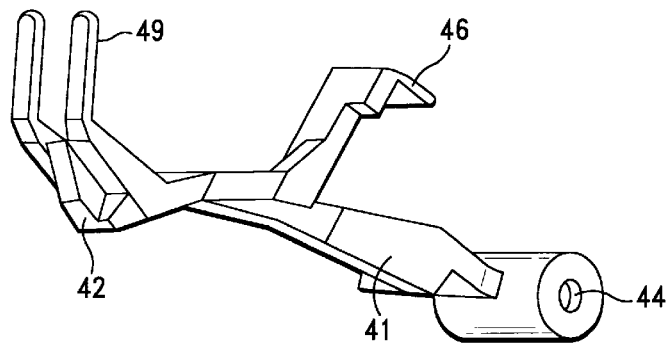
FIG.—3B
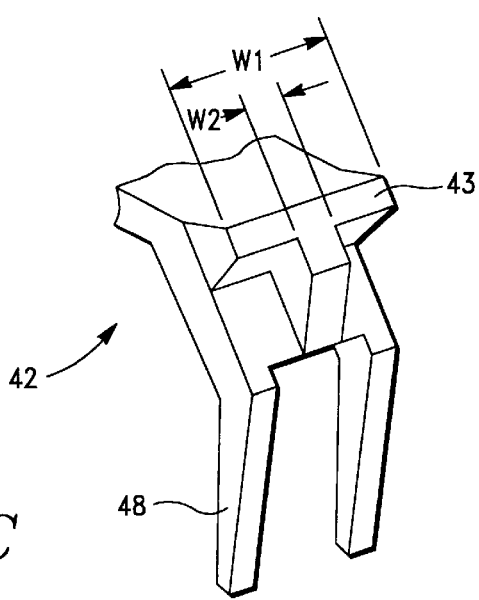
FIG.—3C

TAPE BUCKLING MECHANISM FOR SINGLE REEL CARTRIDGE TAPE RECORDING

FIELD OF THE INVENTION

The present invention relates to tape recording. More particularly, the present invention relates to a mechanism for buckling a take-up leader with a cartridge leader in a single reel cartridge tape drive.

BACKGROUND OF THE INVENTION

A typical magnetic tape includes a plastic film, e.g. a Mylar substrate, having a coating of magnetic recording material on one side and a non-stick "back coating" on the other side of the Mylar. The tape runs between a rotatable supply tape reel, typically housed within a tape cartridge 10 such as that shown in FIG. 1a, and a rotatable take-up tape reel in the tape drive assembly 15, such as that shown in FIG. 1b. The take-up reel includes a take-up leader 50 secured therein, shown in FIG. 1b, while the supply reel includes a cartridge leader 30 at one end of the tape, shown in FIG. 1a. As the tape cartridge 10 is inserted into a tape drive, the take-up leader 50 locks with cartridge leader 30 and pulls and transfers the tape from the supply reel to the take-up reel. The procedure of locking the take-up leader 50 with the cartridge leader 30 is known as "buckling". Typically, the buckling process is automatic is response to the tape cartridge being inserted into the tape drive.

FIG. 2a shows the cartridge leader 30 including a cartridge leader hoop 39. The hoop 39 includes a notch area 32. The hoop 39 is dimensioned to enable a take-up leader nose 51 and a take-up leader neck 55, both shown in FIG. 2b, to pass therethrough. The notch 32 is dimensioned to enable the neck 55 to pass therethrough, but prevent the nose 51 from passing therethrough. Thus, in a buckled position, the nose 51 is locked against the notch 32 about take-up leader ears 56 and 57. FIG. 2b also shows a take-up leader window 52 enabling a buckling mechanism to engage the take-up leader 50. Commonly assigned U.S. Pat. Nos. 4,662,049 and 4,720,913 provide examples of prior tape buckling arrangements and structures.

During the buckling process, various factors may cause unsuccessful buckling, some leading to complete failure of the tape drive. For example, over an extended period of usage, the take-up leader may develop a condition called "curl in". In this state, the take-up leader tends to "curl" away from the cartridge leader hoop, making a successful buckling operation less likely. In addition, if the tape cartridge is not loaded into the drive, the cartridge leader may be buckled in a misaligned manner.

Prior buckling mechanisms of the type generally described in the referenced patents have not been designed to compensate for leader curl or misaligned cartridges. Two common buckling failure modes are "leader runaway" and "half-buckling". Leader runaway occurs when the leaders are not completely locked, and the take-up leader unbuckles before the cartridge leader has been pulled into the take-up reel. Half-buckling occurs when only one ear of the take-up leader nose engages and locks to the cartridge leader hoop often resulting in leader runaway. Leader runaway if a failure which cannot be fixed by the end user and requires the tape drive to be returned to the manufacturers for repair. Thus it is imperative for tape drive manufacturers to ensure that a possibility of leader runaway, as well as any unsuccessful buckling, be minimized.

The present invention provides a buckling mechanism which improves the reliability of the buckling process by minimizing the failure modes mentioned herein above.

SUMMARY OF THE INVENTION WITH OBJECTS

The present invention provides a buckling mechanism disposed within a tape drive assembly which provides enhanced buckling reliability between a take-up leader and a cartridge leader. The buckling mechanism includes a buckling link, a buckling arm, and a link driver. The buckling link includes a protruding portion at one end and is pivotably biased about the other end. The protruding portion is dimensioned to contact and guide the take-up leader into a locking relationship with the cartridge leader, as the cartridge leader is loaded into the drive. The combination of the biasing force and the size dimension of the protruding portion enables the buckling link to maintain constant contact with the take-up leader throughout the buckling process ensuring that the leaders do not lose locking relationship. The buckling arm releasably engages with the take-up leader, pulling the take-up leader into the locking position with the cartridge leader. The link driver includes a cam portion for contacting the cartridge. The link driver is also coupled to the buckling arm thereby providing cammed movement for the buckling arm. In addition, the buckling link is mounted such that it functions independently of the other components, enabling it to maintain the biasing force against the take-up leader even after the buckling arm releases the take-up leader.

BRIEF DESCRIPTION OF THE DRAWINGS

In the Drawings:

FIG. 1a is an isometric view in elevation of a prior art single reel tap cartridge including a cartridge leader therein.

FIG. 1b is a front view in elevation of a front panel of a prior art tape drive, showing a take-up leader inside the tape drive, located at a nominal position to engage a cartridge leader upon cartridge insertion.

FIG. 3a is an enlarged isometric view of the buckling mechanism in accordance with principles of the present invention.

FIG. 3b is an enlarged isometric view of the buckling link shown in FIG. 3a.

FIG. 3c is a plan view of the protruding portion of the FIG. 3b buckling link shown cut away from the other portion of the buckling link of FIG. 3b.

DETAILED DESCRIPTION OF A PREFERRED EMBODIMENT

Figure 2A:
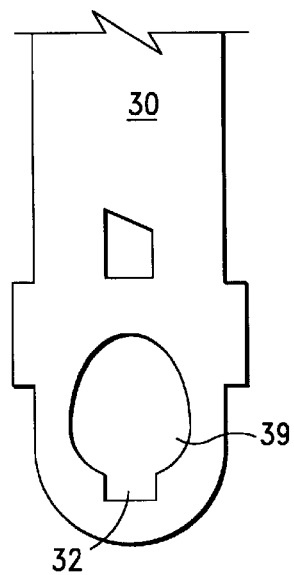
FIG. 2a is an enlarged plan view of a prior art cartridge leader.
Figure 2B:
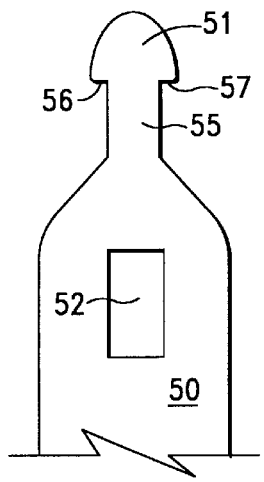
FIG. 2b is an enlarged plan view of a prior art take-up leader, having the same dimensional scale as the FIG. 2a cartridge leader.

In accordance with principles of the present invention, a buckling mechanism 70 is shown in FIG. 3a and includes three members: a buckling link 40, a buckling arm 60 and a link driver 20. Link driver 20 is pivotable at one end about pin 24 and coupled at the other end to buckling arm 60 about pivot pin 65. Link driver 20 also includes a cam portion (not shown) for engaging contact with the tape cartridge 10 as the cartridge is inserted into the tape drive 15.

As shown in FIG. 3a, buckling arm 60 includes an elongated slot 64 at one end and a hook member 62 extending from the other end, enabling both members to move in concert. The slot 64 fits over a pin (64a), enabling the buckling arm 60 to move transversely as the buckling arm 60 rotated by the link driver 20. As will be explained herein below, this translational movement, in turn, enables the hook member 62 of the buckling arm 60 to releasably engage the take-up leader 50 without interfering with tape travel. During operation, tape cartridge 10 is inserted and pushed into tape drive 15, transmitting rotational movement to link driver 20 and simultaneous rotational and transverse motion to buckling arm 60. Thus, as the tape cartridge 10 is inserted into the drive 15, tape cartridge 10 pushes against link driver 20 camming portion, initiating rotational movement of link driver 20 about end 24. Concurrently, buckling arm 60 rotates in concert with link driver 20 and moves translationally about slot 64.

The buckling link 40 is presented in detail in FIG. 3b and includes a protruding portion 42 extending from one end of an elongated body 41. Finger-like members 48 also extend from the same end, away from the protruding portion 42. The buckling link 40 is pivotably biased about an opposite end 44, where a spring (not shown) provides a constant rotational biasing force to the protruding portion 42 towards the leaders. An arm 46 extends away from the body 41 at a location intermediate the two ends. During a buckling mechanism assembly process, the arm 46 functions to maintain the link 40 in concert with other members of the buckling mechanism 70. Buckling link 40 and protruding portion 42 are shaped and dimensioned such that as a cartridge 10 is inserted into the tape drive 15 and pushed against buckling link 40, the protruding portion 42 is positioned to push take-up leader into cartridge leader hoop 39. Unlike the buckling arm 60, buckling link 40 is not coupled to link driver 20 and thus moves independently of the link driver 20.

In the preferred embodiment, the protruding portion 42 includes an improved tapered plateau region defining a T-shaped face 43, shown in FIG. 3c, for contacting and guiding the take-up leader 50 into a locking position with the cartridge leader 37.

Figure 3D:
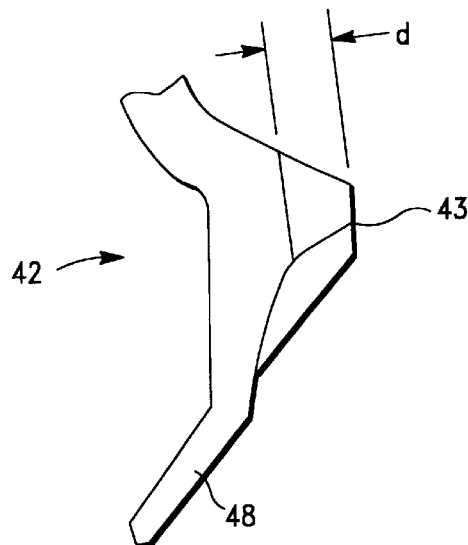
FIG. 3d is a side view in elevation of the protruding portion of FIG. 3c, shown cut away from the other portion of the buckling link of FIG. 3b.

Specifically, the T-shaped face 43 includes a wide portion W1 and a narrower portion W2. Wide portion W1 is dimensioned sufficiently wider than the width of the neck 55 for guiding the nose 51 and the neck 55 into a penetrating relationship with the hoop 39 as well as for preventing the neck from "slipping" off the T-shaped face 43. The narrow portion W2 is also wide enough to prevent the neck 55 from slipping and possibly half-buckling. In the present embodiment, the wide portion W1 exhibits a nominal width of approximately 0.26 inches, while the neck 55 exhibits a nominal width of approximately 0.10 inches. As shown in FIG. 3d, a depth, d, of protruding portion 42 is dimensioned to ensure that the take-up leader nose 51 penetrates through the cartridge leader hoop 39 as the cartridge 10 is inserted into the drive 15.

As shown in FIG. 3a, the buckling link 40 functions independently of the buckling arm 60 and the link driver 20. This enables the protruding portion 42 to maintain biased contact against the take-up leader 50, keeping the take-up leader nose 51 protruding through the cartridge leader hoop 39 after the buckling arm 60 has disengaged from the take-up leader 50. As will be explained herein below, these features cooperate to improve buckling reliability.

Figure 4A:
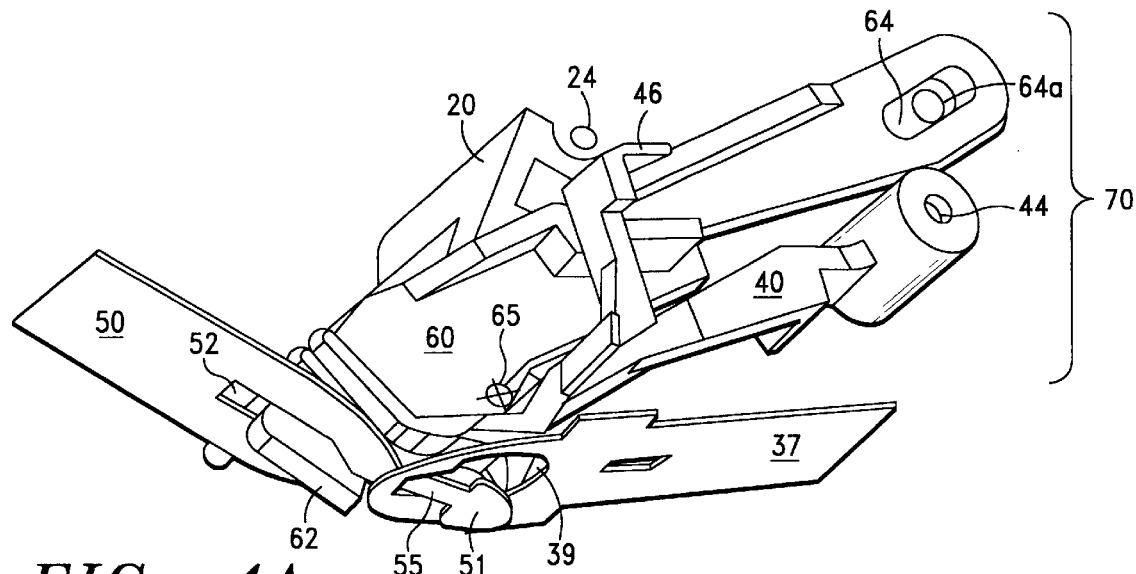
FIGS. 4a, 4b, and 4c are isometric views showing the functional relationships between the buckling mechanism and the take-up leader and cartridge leader in successive stages of the tape buckling operation employing the FIG. 3a improved buckling mechanism.
Figure 4B:
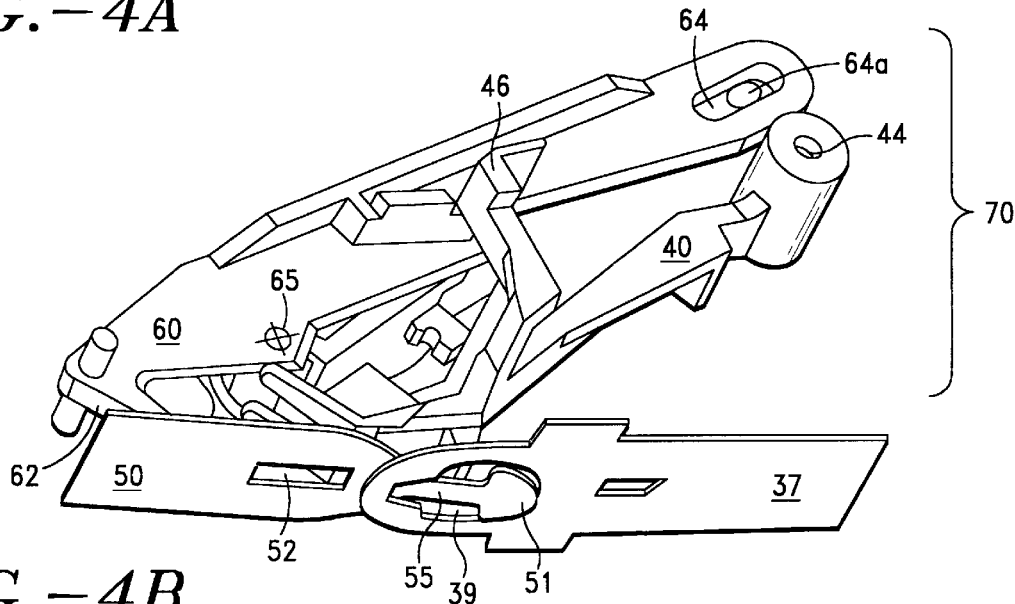
Figure 4C:
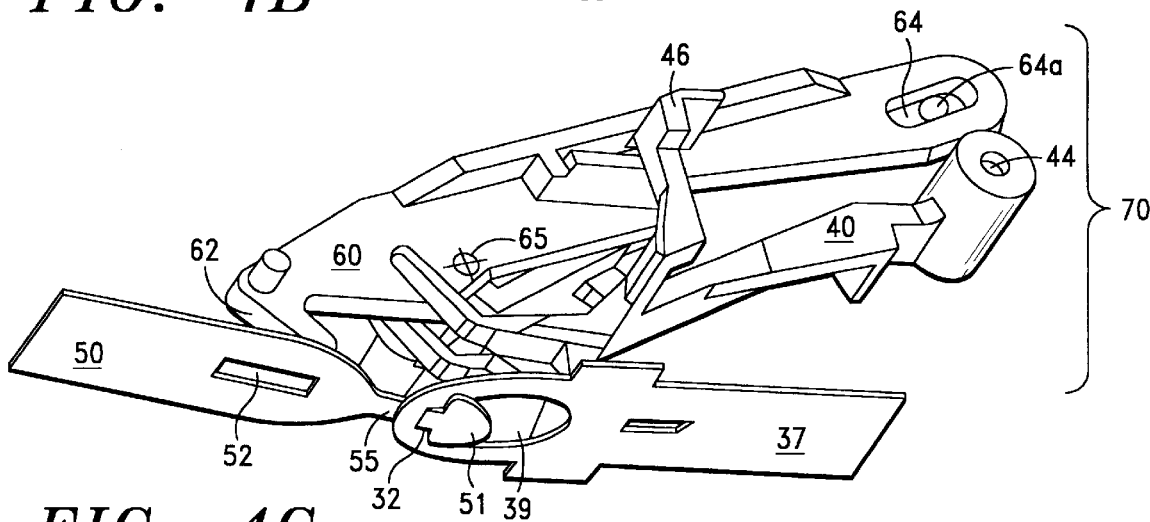

FIGS. 4a–4c show successive stages of a buckling process. At the stage depicted in FIG. 4a, the tape cartridge 10 has been inserted into the tape drive 15, but not fully installed, i.e. the cartridge 10 has not contacted the link driver 20 and buckling link. As shown, take-up leader 50 is engaged by the buckling arm hook member 62 through the take-up leader window 52. As the cartridge leader 37 approaches the take-up leader 50, the protruding portion 42 forces the neck 55 and the nose 51 of the take-up leader 50 to penetrate through the hoop 39. In this preferred position, the take-up leader 50 is in position to successfully buckle with the cartridge leader 37 once tension is applied to the take-up leader 50. On the other hand, if the take-up leader is not sufficiently pushed through the hoop 39, take-up leader nose 51 may not lock into the notch 32 of hoop 39 when tension is applied. In addition, if the protruding portion 42 releases contact with the take-up leader 50 before tension is applied, the nose 51 may half-buckle with the hoop 39. Leader curl would further increase this possibility. In improving over the prior art, the protruding portion of the present invention is dimensioned to sufficiently push the neck 55 and nose 51 of take-up leader 50 through the hoop and maintain that position until tension is applied to the take-up leader 50.

As the cartridge 10 is further inserted and fully installed, depicted in FIG. 4b, the cartridge 10 contacts the link driver 20, causing the link driver 20 and the buckling arm 60 to rotate in concert. As buckling arm 60 is being rotated, it is also moving transversely about slot 64, enabling the hook member 62 to disengage with the take-up leader window 52 without contacting the leader 50. Without transverse movement, buckling arm 60 would impact take-up leader 50 during disengagement. At this stage, only the protruding portion 42 remains in contact with the take-up leader 50 as the buckling link 40 remains in biased contact with the tape cartridge 10. Take-up leader nose 51 continues to penetrate through the cartridge leader hoop 39. At the same time, the take-up leader neck 55 is securely supported on the T-shaped face 43 of the protruding portion 42. As previously mentioned, the T-shaped face 43 is advantageously dimensioned to prevent the neck 55 from "slipping off" of the protruding portion 42, thereby minimizing half buckling failures. Again, without the protruding portion 42 remaining in contact with the take-up leader 50, the nose 51 may not sufficiently protrude into the hoop 39 to successfully buckle therewith.

During the final stage of buckling represented in FIG. 4c, the take up reel of the drive 15 applies tension to the take-up leader 50, pulling the take-up leader neck 55 through the notch 32 of the hoop 39 and the take-up leader nose 51 into a locked relationship with the notch 32.

Test data have shown that the present buckling mechanism provides improved reliability over an existing buckling mechanism, particularly with curled leaders. Over 1,000,000 load/unload cycles have been executed with the present buckling mechanism without a detected occurrence of leader runaway. Of the successful cycles, 400,000 were conducted with curled leaders. Each cycle consisted of loading a tape cartridge into a tape drive, transferring the tape from the cartridge to the take-up reel, then rewinding the tape back onto the supply reel and unloading the cartridge. In marked contrast, the prior art buckling mechanism has not on average been able to execute in excess of 13 load/unload cycles with curled leaders without exhibiting leader runaway failure. Failure of the prior buckling mechanism has been undesirably very repeatable when leader curl is present. The new invention overcomes this drawback of the prior mechanism.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. In a tape drive, a mechanism for guiding a nose and neck of a take-up leader to couple with a hoop of a cartridge leader, the mechanism comprising:

a pivotable first member;

a second member coupled to the first member such that rotational movement of the first member creates rotational and translational movement of the second member;

a hook member defined about the second member for releasably engaging the take-up leader;

a third member pivotable about a pivot end to provide a biasing force about a biasing end;

a protruding portion formed about the biasing end, the protruding portion being defined to support and guide the nose and neck of the take-up leader into a locking relationship with the hoop of the cartridge leader wherein the nose and neck penetrate into the hoop;

the protruding portion being dimensioned to maintain constant biased contact against the nose and neck after the nose and neck have penetrated into the hoop; and wherein the protruding portion is adapted to remain in biased contact with the take-up leader after the hook member releases engagement with the take-up leader.

2. The mechanism of claim 1 wherein the hook member is adapted to release the take-up leader after the neck and nose of the take-up leader have penetrated the hoop.

3. The mechanism of claim 1 wherein the hook member engages the take-up leader after the take-up leader has unlocked from the cartridge leader.

4. The mechanism of claim 1 wherein the protruding portion includes a T-shaped face for supporting the take-up leader.

5. The mechanism of claim 4, wherein the T-shaped face includes a portion having a width greater than a width of the neck.

6. A magnetic tape drive assembly including a mechanism for guiding a nose and neck of a take-up leader to couple with a hoop of a cartridge leader, the mechanism comprising:

a pivotable first member;

a second member coupled to the first member such that rotational movement of the first member creates rotational and translational movement of the second member;

a hook member defined about the second member for releasably engaging the take-up leader;

a third member pivotable about a pivot end to provide a biasing force about a biasing end;

a protruding portion formed about the biasing end, the protruding portion being defined to support and guide the nose and neck of the take-up leader into a locking relationship with the hoop of the cartridge leader wherein the nose and neck penetrate into the hoop;

the protruding portion being dimensioned to maintain constant biased contact against the nose and neck after the nose and neck have penetrated into the hoop; and wherein the protruding portion is adapted to remain in biased contact with the take-up leader after the hook member releases engagement with the take-up leader.

* * * * *